United States Patent
Kotalwar et al.

(10) Patent No.: US 11,579,998 B2
(45) Date of Patent: Feb. 14, 2023

(54) DEVICE TELEMETRY CONTROL

(71) Applicant: Nokia Solutions and Networks Oy, Espoo (FI)

(72) Inventors: Jayant Kotalwar, Cupertino, CA (US); Suresh Kannan Durai Samy, Sunnyvale, CA (US); Kendall Harvey, San Jose, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/353,600

(22) Filed: Mar. 14, 2019

(65) Prior Publication Data
US 2020/0293422 A1   Sep. 17, 2020

(51) Int. Cl.
*G06F 16/23* (2019.01)
*G06F 9/54* (2006.01)
(Continued)

(52) U.S. Cl.
CPC .......... *G06F 11/3055* (2013.01); *G06F 9/547* (2013.01); *G06F 11/3051* (2013.01);
(Continued)

(58) Field of Classification Search
CPC ............... H04L 47/125; H04L 12/1818; H04L 12/1827; H04L 67/1036; H04L 67/322
See application file for complete search history.

(56) References Cited

U.S. PATENT DOCUMENTS 5,826,269 A   10/1998  Hussey
6,212,513 B1   4/2001  Shiratori
(Continued)

FOREIGN PATENT DOCUMENTS

WO   WO 2018/118478 A1   6/2018
WO   WO 2018/127747 A1   7/2018
WO   WO 2019/027934 A1   2/2019

OTHER PUBLICATIONS

Tahara, D., et al., "Sinew: A SQL System for Multi-Structured Data," Proceedings of the 2014 ACM SIGMOD International Conference on Management of Data, SIGMOD 2014, pp. 815-826, Jun. 22, 2014.

(Continued)

*Primary Examiner* — John A Follansbee
*Assistant Examiner* — Raqiul A Choudhury
(74) *Attorney, Agent, or Firm* — Tong, Rea, Bentley & Kim, LLC

(57) ABSTRACT

Various example embodiments for supporting device telemetry control are presented. Various example embodiments may provide a customer of a device, which is monitoring the device based on device telemetry whereby the device exposes device data of the device based on device telemetry control information of the device such that the data of the device may be accessed by the customer, with control over device telemetry of the device. Various example embodiments may provide a customer, which may access device data of a device based on device telemetry supported by the device, with additional control over access to the device data of the device via device telemetry by providing the customer with control over the device telemetry including enabling the customer to insert customer device telemetry control information into the device telemetry control information of the device that controls device telemetry on the device.

12 Claims, 4 Drawing Sheets

(51) Int. Cl.
*H04L 43/065* (2022.01)
*G06F 11/30* (2006.01)
*G06F 11/34* (2006.01)

(52) U.S. Cl.
CPC .......... *G06F 11/34* (2013.01); *G06F 16/2379* (2019.01); *H04L 43/065* (2013.01)

(56) References Cited

U.S. PATENT DOCUMENTS

| | | | |
|---|---|---|---|
| 7,047,563 | B1 | 5/2006 | Weber et al. |
| 7,356,601 | B1 | 4/2008 | Clymer et al. |
| 7,441,018 | B1 | 10/2008 | Shafer |
| 7,660,805 | B2 | 2/2010 | Chan |
| 9,143,412 | B1 | 9/2015 | Nay et al. |
| 9,201,739 | B1 | 12/2015 | Bagchi |
| 9,245,088 | B1 | 1/2016 | O'Riordan |
| 9,489,423 | B1 | 11/2016 | Muthiah |
| 9,509,549 | B2 | 11/2016 | Pruss et al. |
| 10,129,232 | B1 | 11/2018 | Phuong et al. |
| 2002/0016771 | A1 | 2/2002 | Carothers |
| 2002/0165961 | A1* | 11/2002 | Everdell ............ H04L 41/22 709/225 |
| 2004/0268125 | A1 | 12/2004 | Clark |
| 2005/0289525 | A1 | 12/2005 | David |
| 2006/0036721 | A1 | 2/2006 | Zhao |
| 2006/0041650 | A1 | 2/2006 | Luo |
| 2006/0224576 | A1 | 10/2006 | Liu |
| 2007/0061786 | A1 | 3/2007 | Zhou |
| 2007/0180127 | A1 | 8/2007 | Vuori |
| 2008/0059631 | A1 | 3/2008 | Bergstrom |
| 2008/0080438 | A1 | 4/2008 | Gopalakrishnan et al. |
| 2008/0242247 | A1* | 10/2008 | Shaffer ............ H04L 12/1827 455/187.1 |
| 2008/0275975 | A1 | 11/2008 | Pandey |
| 2009/0193126 | A1 | 7/2009 | Agarwal et al. |
| 2010/0138534 | A1 | 6/2010 | Mutnuru et al. |
| 2010/0205471 | A1 | 8/2010 | Vavilala et al. |
| 2011/0099255 | A1 | 4/2011 | Srinivasan |
| 2012/0144453 | A1 | 6/2012 | Bolik |
| 2012/0290429 | A1 | 11/2012 | Ostroff |
| 2014/0074517 | A1 | 3/2014 | Sylvester |
| 2015/0169302 | A1 | 6/2015 | DeAnna |
| 2015/0169717 | A1 | 6/2015 | Wang |
| 2015/0271016 | A1 | 9/2015 | Seligson et al. |
| 2016/0164953 | A1 | 6/2016 | Rostislav |
| 2016/0302063 | A1 | 10/2016 | Ahmed |
| 2017/0094033 | A1 | 3/2017 | Sathyadevan |
| 2017/0171102 | A1 | 6/2017 | Parker et al. |
| 2017/0286502 | A1 | 10/2017 | Bar-Or |
| 2017/0286526 | A1 | 10/2017 | Bar-Or |
| 2017/0374174 | A1 | 12/2017 | Evens et al. |
| 2018/0131745 | A1 | 5/2018 | Shakir et al. |
| 2018/0165366 | A1 | 6/2018 | Kumar |
| 2018/0232456 | A1 | 8/2018 | Sherman |
| 2018/0338002 | A1 | 11/2018 | Sherrill |
| 2019/0012211 | A1 | 1/2019 | Selvaraj |
| 2019/0065533 | A1 | 2/2019 | Pulaski |
| 2019/0095252 | A1 | 3/2019 | Tseng et al. |
| 2019/0102409 | A1 | 4/2019 | Shi et al. |
| 2019/0182028 | A1 | 6/2019 | Arquero et al. |
| 2019/0236470 | A1* | 8/2019 | Chauhan ............ G06N 5/047 |
| 2019/0306242 | A1 | 10/2019 | Thummalapalli |
| 2019/0319885 | A1 | 10/2019 | Fan |
| 2019/0327236 | A1 | 10/2019 | Ahuja |
| 2020/0004866 | A1 | 1/2020 | Dilts |
| 2020/0004872 | A1 | 1/2020 | Dilts |
| 2020/0057918 | A1 | 2/2020 | Shin |
| 2020/0097910 | A1 | 3/2020 | Krasnov |
| 2020/0162462 | A1 | 5/2020 | Zayats |
| 2020/0233719 | A1 | 8/2020 | Saini |
| 2020/0250152 | A1 | 8/2020 | Pulaski |
| 2020/0264934 | A1 | 8/2020 | Jayaraman |
| 2020/0272608 | A1 | 8/2020 | Dilts |

OTHER PUBLICATIONS

European Extended Search Report mailed in corresponding EP Application No. 20163183.5 dated Jul. 3, 2020, 8 pages.
Tahara, D., et al., "Sinew: A SQL System for Multi-Structured Data," Proceedings of the 2014 ACM SIGMOD International Conference on Management of Data, SIGMOD 2014, Jun. 22, 2014, pp. 815-826.
Omnikrys, "How to import data from text file to mysql database," https://stackoverflow.com/questions/13579810/how-to-import-data-from-text-file-to-mysql-database, printed on Sep. 9, 2020, 6 pages.

* cited by examiner

DEVICE TELEMETRY CONTROL

TECHNICAL FIELD

Various example embodiments relate generally to communication systems, more particularly but not exclusively, to telemetry control for devices in communication systems.

BACKGROUND

Various types of devices (e.g., routers, servers, and so forth) may operate in various types of environments (e.g., communication networks, datacenters, enterprises, home networks, and so forth).

SUMMARY

In at least some example embodiments, an apparatus includes at least one processor and at least one memory including program code, wherein the at least one memory and the program code are configured to, with the at least one processor, cause the apparatus to at least receive, by a device, a device telemetry control message configured to request control over device telemetry control information configured to control exporting of device data from a database of the device and update, at the device based on the device telemetry control message, the device telemetry control information configured to control exporting of device data from the database of the device. In at least some example embodiments, the device telemetry control message includes a request for insertion of new device telemetry control information into the device telemetry control information configured to control exporting of device data from the database of the device. In at least some example embodiments, the device telemetry control message includes a request for updating, based on new device telemetry control information included within the device telemetry control message, the device telemetry control information configured to control exporting of device data from the database of the device. In at least some example embodiments, the device telemetry control message includes a request for deletion of at least a portion of the device telemetry control information configured to control exporting of device data from the database of the device. In at least some example embodiments, the device telemetry control message includes a key identifying the device data for which the device telemetry control message is intended. In at least some example embodiments, the key is represented using a JavaScript Object Notation (JSON) JavaScript Path (JSPath). In at least some example embodiments, the device telemetry control message includes a data field including new device telemetry control information to be included in the device telemetry control information configured to control exporting of device data from the database of the device. In at least some example embodiments, the new device telemetry control information is formatted based on JavaScript Object Notation (JSON) JavaScript Path (JSPath). In at least some example embodiments, the device telemetry control information is stored as part of the device data. In at least some example embodiments, the device telemetry control information includes at least one of a data identifier configured to identify the device data with which the device telemetry control information is associated, a timing parameter configured to control timing of exporting of the device data from the database of the device, a location parameter configured to identify an export location for the device data being exported from the database of the device, or a data control parameter configured to control a manner in which the device data is exported from the database of the device. In at least some example embodiments, the device telemetry control message is received from an application. In at least some example embodiments, the application is running on the device. In at least some example embodiments, the application is running on a remote device that is remote from the device. In at least some example embodiments, the device telemetry control request is received in a remote procedure call. In at least some example embodiments, the remote procedure call is based on gRPC. In at least some example embodiments, the at least one memory and the program code are configured to, with the at least one processor, cause the apparatus to at least send, by the device toward a source of the device telemetry control message, an indication that the device telemetry control information configured to control exporting of device data from the database of the device has been updated. In at least some example embodiments, the at least one memory and the program code are configured to, with the at least one processor, cause the apparatus to at least export, by the device from the database of the device based on the device telemetry control information, the device data. In at least some example embodiments, the device is a router, a switch, or a server. In at least some example embodiments, the apparatus is the device, is a portion of the device, or is otherwise associated with the device.

In at least some example embodiments, a non-transitory computer-readable medium includes instructions configured to cause an apparatus to at least receive, by a device, a device telemetry control message configured to request control over device telemetry control information configured to control exporting of device data from a database of the device and update, at the device based on the device telemetry control message, the device telemetry control information configured to control exporting of device data from the database of the device. In at least some example embodiments, the device telemetry control message includes a request for insertion of new device telemetry control information into the device telemetry control information configured to control exporting of device data from the database of the device. In at least some example embodiments, the device telemetry control message includes a request for updating, based on new device telemetry control information included within the device telemetry control message, the device telemetry control information configured to control exporting of device data from the database of the device. In at least some example embodiments, the device telemetry control message includes a request for deletion of at least a portion of the device telemetry control information configured to control exporting of device data from the database of the device. In at least some example embodiments, the device telemetry control message includes a key identifying the device data for which the device telemetry control message is intended. In at least some example embodiments, the key is represented using a JavaScript Object Notation (JSON) JavaScript Path (JSPath). In at least some example embodiments, the device telemetry control message includes a data field including new device telemetry control information to be included in the device telemetry control information configured to control exporting of device data from the database of the device. In at least some example embodiments, the new device telemetry control information is formatted based on JavaScript Object Notation (JSON) JavaScript Path (JSPath). In at least some example embodiments, the device telemetry control information is stored as part of the device data. In at least some example embodiments, the device telemetry control information includes at least one of a data identifier configured to identify the device data with which the device telemetry control information is associated, a timing parameter configured to control timing of exporting of the device data from the database of the device, a location parameter configured to identify an export location for the device data being exported from the database of the device, or a data control parameter configured to control a manner in which the device data is exported from the database of the device. In at least some example embodiments, the device telemetry control message is received from an application. In at least some example embodiments, the application is running on the device. In at least some example embodiments, the application is running on a remote device that is remote from the device. In at least some example embodiments, the device telemetry control request is received in a remote procedure call. In at least some example embodiments, the remote procedure call is based on gRPC. In at least some example embodiments, the non-transitory computer-readable medium includes instructions configured to cause the apparatus to at least send, by the device toward a source of the device telemetry control message, an indication that the device telemetry control information configured to control exporting of device data from the database of the device has been updated. In at least some example embodiments, the non-transitory computer-readable medium includes instructions configured to cause the apparatus to at least export, by the device from the database of the device based on the device telemetry control information, the device data. In at least some example embodiments, the device is a router, a switch, or a server. In at least some example embodiments, the apparatus is the device, is a portion of the device, or is otherwise associated with the device.

In at least some example embodiments, a method includes at least receiving, by a device, a device telemetry control message configured to request control over device telemetry control information configured to control exporting of device data from a database of the device and updating, at the device based on the device telemetry control message, the device telemetry control information configured to control exporting of device data from the database of the device. In at least some example embodiments, the device telemetry control message includes a request for insertion of new device telemetry control information into the device telemetry control information configured to control exporting of device data from the database of the device. In at least some example embodiments, the device telemetry control message includes a request for updating, based on new device telemetry control information included within the device telemetry control message, the device telemetry control information configured to control exporting of device data from the database of the device. In at least some example embodiments, the device telemetry control message includes a request for deletion of at least a portion of the device telemetry control information configured to control exporting of device data from the database of the device. In at least some example embodiments, the device telemetry control message includes a key identifying the device data for which the device telemetry control message is intended. In at least some example embodiments, the key is represented using a JavaScript Object Notation (JSON) JavaScript Path (JSPath). In at least some example embodiments, the device telemetry control message includes a data field including new device telemetry control information to be included in the device telemetry control information configured to control exporting of device data from the database of the device.

In at least some example embodiments, the new device telemetry control information is formatted based on JavaScript Object Notation (JSON) JavaScript Path (JSPath). In at least some example embodiments, the device telemetry control information is stored as part of the device data. In at least some example embodiments, the device telemetry control information includes at least one of a data identifier configured to identify the device data with which the device telemetry control information is associated, a timing parameter configured to control timing of exporting of the device data from the database of the device, a location parameter configured to identify an export location for the device data being exported from the database of the device, or a data control parameter configured to control a manner in which the device data is exported from the database of the device. In at least some example embodiments, the device telemetry control message is received from an application. In at least some example embodiments, the application is running on the device. In at least some example embodiments, the application is running on a remote device that is remote from the device. In at least some example embodiments, the device telemetry control request is received in a remote procedure call. In at least some example embodiments, the remote procedure call is based on gRPC. In at least some example embodiments, the method includes sending, by the device toward a source of the device telemetry control message, an indication that the device telemetry control information configured to control exporting of device data from the database of the device has been updated. In at least some example embodiments, the method includes exporting, by the device from the database of the device based on the device telemetry control information, the device data. In at least some example embodiments, the device is a router, a switch, or a server.

In at least some example embodiments, an apparatus includes means for receiving, by a device, a device telemetry control message configured to request control over device telemetry control information configured to control exporting of device data from a database of the device and means for updating, at the device based on the device telemetry control message, the device telemetry control information configured to control exporting of device data from the database of the device. In at least some example embodiments, the device telemetry control message includes a request for insertion of new device telemetry control information into the device telemetry control information configured to control exporting of device data from the database of the device. In at least some example embodiments, the device telemetry control message includes a request for updating, based on new device telemetry control information included within the device telemetry control message, the device telemetry control information configured to control exporting of device data from the database of the device. In at least some example embodiments, the device telemetry control message includes a request for deletion of at least a portion of the device telemetry control information configured to control exporting of device data from the database of the device. In at least some example embodiments, the device telemetry control message includes a key identifying the device data for which the device telemetry control message is intended. In at least some example embodiments, the key is represented using a JavaScript Object Notation (JSON) JavaScript Path (JSPath). In at least some example embodiments, the device telemetry control message includes a data field including new device telemetry control information to be included in the device telemetry control information configured to control exporting of device data from the database of the device. In at least some example embodiments, the new device telemetry control information is formatted based on JavaScript Object Notation (JSON) JavaScript Path (JSPath). In at least some example embodiments, the device telemetry control information is stored as part of the device data. In at least some example embodiments, the device telemetry control information includes at least one of a data identifier configured to identify the device data with which the device telemetry control information is associated, a timing parameter configured to control timing of exporting of the device data from the database of the device, a location parameter configured to identify an export location for the device data being exported from the database of the device, or a data control parameter configured to control a manner in which the device data is exported from the database of the device. In at least some example embodiments, the device telemetry control message is received from an application. In at least some example embodiments, the application is running on the device. In at least some example embodiments, the application is running on a remote device that is remote from the device. In at least some example embodiments, the device telemetry control request is received in a remote procedure call. In at least some example embodiments, the remote procedure call is based on gRPC. In at least some example embodiments, the apparatus includes means for sending, by the device toward a source of the device telemetry control message, an indication that the device telemetry control information configured to control exporting of device data from the database of the device has been updated. In at least some example embodiments, the apparatus includes means for exporting, by the device from the database of the device based on the device telemetry control information, the device data. In at least some example embodiments, the device is a router, a switch, or a server.

In at least some example embodiments, an apparatus includes at least one processor and at least one memory including program code, wherein the at least one memory and the program code are configured to, with the at least one processor, cause the apparatus to at least send, by an application toward a device, a device telemetry control message configured to request control over device telemetry control information configured to control exporting of device data from a database of the device and receive, by the application from the device, device data exported from the database of the device based on the device telemetry control information. In at least some example embodiments, a non-transitory computer-readable medium includes instructions configured to cause an apparatus to at least send, by an application toward a device, a device telemetry control message configured to request control over device telemetry control information configured to control exporting of device data from a database of the device and receive, by the application from the device, device data exported from the database of the device based on the device telemetry control information. In at least some example embodiments, a method includes at least sending, by an application toward a device, a device telemetry control message configured to request control over device telemetry control information configured to control exporting of device data from a database of the device and receiving, by the application from the device, device data exported from the database of the device based on the device telemetry control information. In at least some example embodiments, an apparatus includes means for sending, by an application toward a device, a device telemetry control message configured to request control over device telemetry control information configured to control exporting of device data from a database of the device and means for receiving, by the application from the device, device data exported from the database of the device based on the device telemetry control information. In at least some example embodiments, the apparatus is a device configured to run the application, is a portion of a device configured to run the application, or is otherwise associated with a device configured to run the application.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
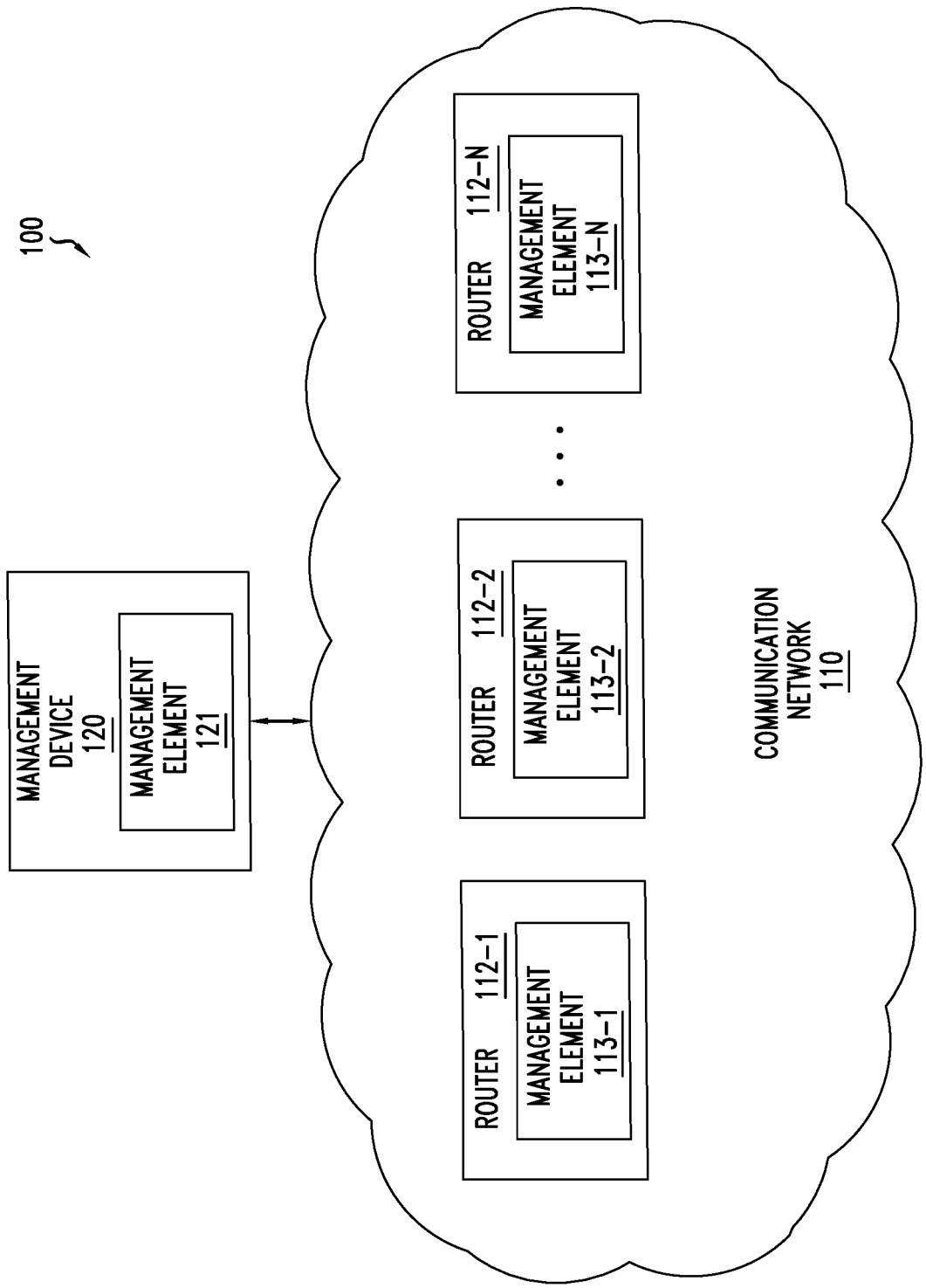
FIG. 1 depicts an example embodiment of a communication system including a communication network and a management device configured to manage the communication network.

Various example embodiments for supporting device telemetry control for a device are presented. Various example embodiments for supporting device telemetry control may provide a customer of a device, which is monitoring the device based on device telemetry whereby the device exposes device data of the device based on device telemetry control information of the device such that the device data of the device may be accessed by the customer, with control over the device telemetry of the device. Various example embodiments for supporting device telemetry control may provide a customer, which may access device data of a device based on device telemetry supported by the device, with additional control over access to the device data of the device via device telemetry by providing the customer with control over the device telemetry. Various example embodiments for supporting device telemetry control may provide a customer with control over the device telemetry of the device by enabling the customer to control the device telemetry control information of the device that controls exposing of the device data of the device (e.g., enabling the customer to insert customer device telemetry control information into the device telemetry control information of the device that controls device telemetry on the device and to remove customer device telemetry control information from the device telemetry control information of the device that controls device telemetry on the device). Various example embodiments for supporting device telemetry control may provide a customer with additional control over access to the device data of the device via device telemetry, by providing the customer with control over the device telemetry, by configuring a device to receive, from an application, a device telemetry control request configured to request control over device telemetry control information configured to control exporting of device data from a database of the device and to update, based on the device telemetry control request, the device telemetry control information configured to control exporting of device data from the database of the device. Various example embodiments for supporting device telemetry control may provide a customer with additional control over access to the device data of the device via device telemetry, by providing the customer with control over the device telemetry, by configuring a customer application to send, toward a device, a device telemetry control request configured to request control over device telemetry control information configured to control exporting of device data from a database of the device and to receive, from the device, device data exported from the database of the device based on the device telemetry control information. It will be appreciated that these and various other example embodiments presented herein may be used or adapted for use in supporting telemetry control for various types of devices (e.g., routers, switches, servers, or the like); however, for purposes of clarity in describing various example embodiments of device telemetry control, various example embodiments of device telemetry control presented herein are primarily described within the context of supporting telemetry for routers. It will be appreciated that the customer of the device may be an owner of the device, an operator of the device, or other suitable customer of the device (e.g., entity, person, device, program, application, or the like). It will be appreciated that these and various other example embodiments and advantages or potential advantages of supporting device telemetry control may be further understood by way of reference to the various figures, which are discussed further below.

FIG. 1 depicts an example embodiment of a communication system including a communication network and a management device configured to manage the communication network.

The communication system 100, as indicated above, includes a communication network 110 and a management device 120 configured to manage the communication network 110.

The communication network 110 may include any network which may be managed by a management device 120. For example, the communication network 110 may be an operator network, an enterprise network, or the like. For example, the communication network 110 may be an access network, a core network, a backhaul network, a datacenter network, or the like. For example, the communication network 110 may be a physical communication network, a virtualized communication network (e.g., virtualized based on network function virtualization (NFV) techniques or other suitable virtualization techniques), or the like. It will be appreciated that, although primarily presented herein within the context of specific types of communication networks, various other types of communication networks may be supported.

The communication network 110 includes a set of routers 112-1-112-N (collectively, routers 112). The routers 112 may be configured to provide various communication services for supporting communications within communication network 110. The routers 112 may be arranged in various network topologies, which may depend on the type of communication network 110 in which the routers 112 are disposed. For example, the routers 112 may be arranged in a mesh topology (e.g., in a network operator backhaul network), in a spine-and-leaf topology (e.g., in a datacenter network), or the like. The routers 112 may be configured to be managed by the management device 120. It will be appreciated that, although primarily presented herein as including specific types devices (illustratively, routers 112), communication network 110 may include various other types of devices (e.g., switches, hubs, bridges, or the like, as well as various combinations thereof).

The management device 120 may be configured to support management of the communication network 110. The management device 120 may be configured to support management of the communication network 110 for various management purposes, at various management scales, or the like, as well as various combinations thereof. For example, the management device 120 may be configured to support configuration functions, monitoring functions, maintenance functions, or the like, as well as various combinations thereof. For example, the management device 120 may be configured to support service-level management (e.g., as a service management system or other similar system), network-level management (e.g., as a network management system (NMS) or other similar system), element-level management (e.g., as an element management system (EMS) or other similar system), or the like, as well as various combinations thereof. The management device 120 may be one of various types of devices which may be used to support management functions for communication network 110, such as a workstation of a management system configured to support management of the routers 112, a user device (e.g., a laptop, a tablet, a smartphone, or the like) configured to provide remote management access to the routers 112, a local console connected to one or more of the routers 112, or the like. It will be appreciated that the management device 120 may be configured to support various other management capabilities for managing the communication network 110.

The management device 120 is configured to manage the routers 112 of communication network 110. The management device 120 may support various capabilities which enable the management device 120 to access and manage routers 112 and, similarly, routers 112 may support various capabilities which enable access and management by the management device 120. For example, such capabilities may include management interfaces (e.g., command-line interfaces (CLIs), graphical user interfaces (GUIs), or the like), management applications (e.g., router configuration applications, router status retrieval applications, or the like), management elements (e.g., devices, modules, systems, subsystems or the like), communications capabilities (e.g., inter-process communications capabilities such as remote procedure calls (RPCs), protocols such as telnet or secure shell (SSH), or the like), or the like, as well as various combinations thereof. It will be appreciated that these capabilities may be considered to be represented in FIG. 1 by the management elements 113-1-113-N on routers 112-1-112-N, respectively, and the management element 121 on management device 120.

In at least some embodiments, for example, the communication network 110 may be configured to support router telemetry control. In at least some embodiments, for example, a router 112 of the communication network 110 and the management device 120 (e.g., a device running a customer application) may be configured to cooperate in order to support router telemetry control. An example embodiment for supporting router telemetry control is presented in FIG. 2.

It will be appreciated that, although primarily presented with respect to specific types, numbers, and arrangements of elements, communication system 100 may include various other types, numbers and arrangements of elements.

Figure 2:
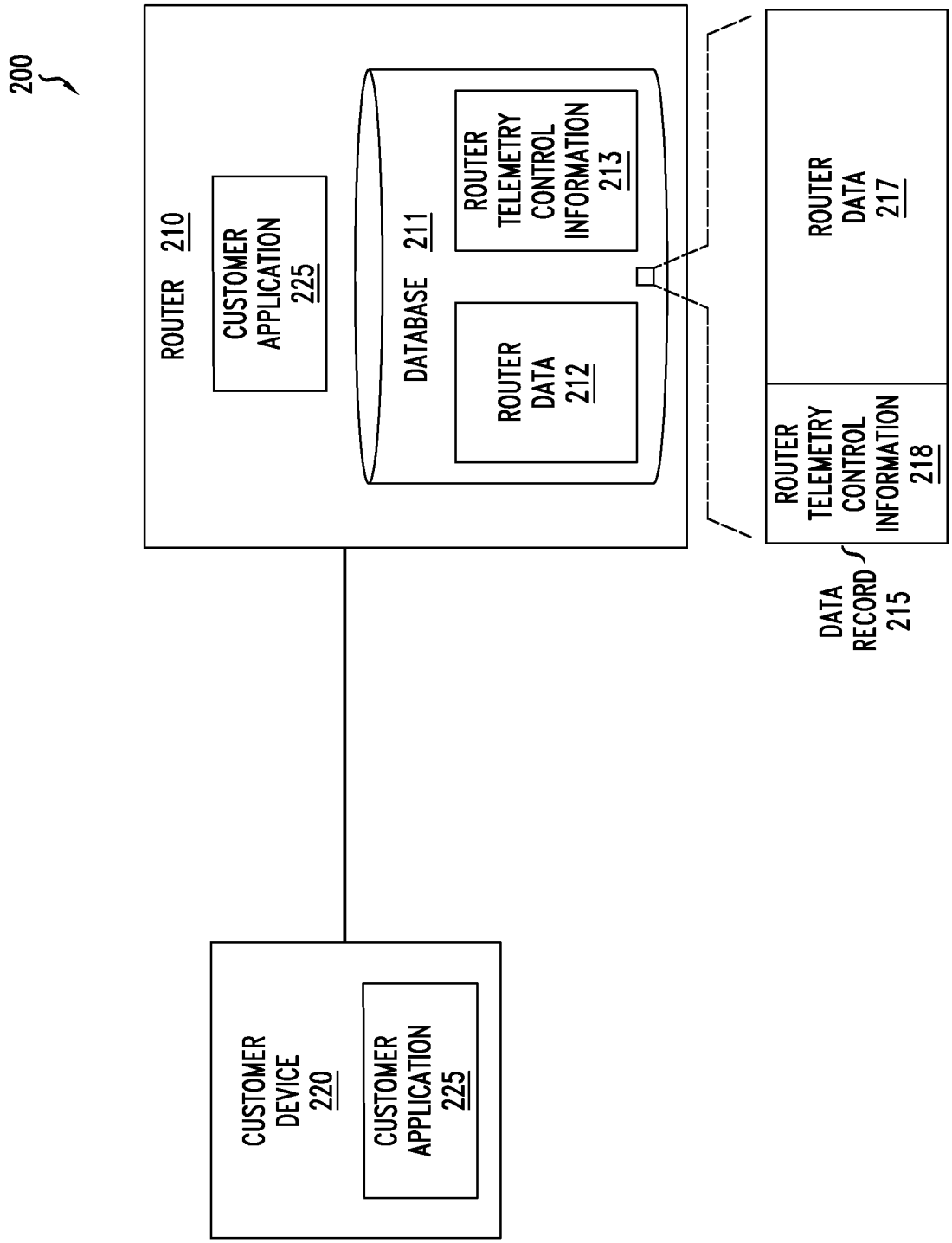
FIG. 2 depicts an example embodiment of a system configured to support router telemetry control.

FIG. 2 depicts an example embodiment of a system configured to support router telemetry control.

As depicted in FIG. 2, a system 200 includes a router 210 and a customer device 220. The router 210 is configured to support router telemetry. The customer device 220 is configured to support customer control over router telemetry of the router 210.

The router 210 includes a database 211 storing router data 212 that may be exported from the router 210 based on router telemetry control information 213. It will be appreciated that the exporting of the router data 212 that based on router telemetry control information 213 may be performed in various ways (e.g., using data push techniques, using data publication techniques, or the like, as well as various combinations thereof).

The router data 212 may include any data associated with operation of the router 210 to support routing services, such as service status data (e.g., route up/down state data, tunnel up/down state data, or the like), performance management data (e.g., input-output and error counters, queue statistics, or the like), or the like, as well as various combinations thereof. It is noted that the router data 212 that is exported from the router 210 based on router telemetry capabilities also may be referred to as router telemetry data.

The router telemetry control information 213 is configured to control exporting of the router data 212 by the router 210. The router telemetry control information 213 may include various types of information which may be used to control exporting of the router data 212 by the router 210, such as a data identifier configured to identify the router data 212 with which the router telemetry control information 213 is associated, a timing parameter configured to control timing of exporting of the router data 212 by the router 210, a location parameter configured to identify an export location for the router data 212 being exported by the router 210 (e.g., a path identifying a location at which the router data 212 will be available, a channel to which to subscribe to receive a publication of the router data 212, or the like), a data control parameter configured to control a manner in which the router data 212 is exported by the router 210 (e.g., the exact data to be exported, a data format in which the data is to be exported, or the like), or the like, as well as various combinations thereof. The router telemetry control information 213 may include provider router telemetry control information (e.g., router telemetry control information provided with the router 210 by the router provider for use as the router telemetry control information) and, in accordance with various embodiments presented herein for supporting customer control over router telemetry control information, may include customer router telemetry control information (e.g., router telemetry control information provided by a customer, such as an operator that is running the router in its network, for use on the router in controlling exporting of the router data 212), or the like, as well as various combinations thereof. It is noted that the router telemetry control information that is used to control exporting of the router data 212 from the router 210 based on router telemetry capabilities also may be referred to as router telemetry state information.

The router data 212 and the router telemetry control information 213 may be stored in various ways. The router data 212 and the router telemetry control information 213 may be stored using various data formats (e.g., using Extensible Markup Language (XML), JavaScript Object Notation (JSON), or the like, as well as various combinations thereof). The router data 212 and the router telemetry control information 213 may be associated in various ways. The router telemetry control information 213 that is configured to control exporting of router data 212 may be stored in conjunction with the router data 212. For example, for a given key identifying a given set of data in the router data 212 (e.g., a node, a link, a tunnel, a service, or the like), the router telemetry control information 213 that is configured to control exporting of that given set of data in the router data 212 may be stored in a manner for being associated with that given set of data in the router data 212 (e.g., as part of that given set of data in the router data 212 such as where that given set of data in the router data 212 and the associated router telemetry control information 213 are associated with a given key, in a manner for linking the router telemetry control information 213 with that given set of data in the router data 212 such as where that given set of data in the router data 212 includes a pointer to a location storing the associated router telemetry control information 213, or the like). It is noted that association of the router telemetry control information 213 with the router data 212 that it controls is illustrated in FIG. 2 by a data record 215 depicted as including router data 217 and associated router telemetry control information 218 configured to control exporting of the router data 217. It will be appreciated that the router data 212 and the router telemetry control information 213 may be organized in various other ways for enabling the router telemetry control information 213 to control exporting of the router data 212 from the router 210.

The customer device 220 provides a customer application 225 configured to control router telemetry of the router 210. The customer application 225 may be executed on the customer device 220 for remote interaction with the router 210 to control the router telemetry of the router 210 (represented in FIG. 2 by illustration of customer application 225 within customer device 220) or may be provided to the router 210 and executed on the router 210 for local interaction with the router 210 to control the router telemetry of the router 210 (represented in FIG. 2 by illustration of customer application 225 within router 210). The interaction between the customer application 225 and the router 210 may be based on remote procedure calls. For example, the interaction between the customer application 225 and the router 210 may be based on remote procedure calls based on gRPC or other suitable remote procedure call protocols. The interaction between the customer application 225 and the router 210 may be based on interaction by the customer application 225 with one or more elements on the router 210 (e.g., one or more elements of the router 210 configured to support detection and handling of remote procedure calls from the customer application 225). For example, interaction between the customer application 225 and the router 210 may be based on interaction by the customer application 225 with a remote procedure call manager (e.g., a Software Development Kit (SDK) service manager) running on router 210. It will be appreciated that the interaction between the customer application 225 and the router 210, for supporting customer router telemetry control by the customer of customer device 220, may be provided in various other ways.

The customer application 225 and the router 210, as indicated above, may cooperate in a manner supporting customer router telemetry control. The customer application 225 initiates a router telemetry control request that is received by the router 210. The router telemetry control request is configured to request control over the router telemetry control information 213 of the router 210. The router telemetry control request may be a request to add new router telemetry control information to router telemetry control information 213 of the router 210 (e.g., new router telemetry control information specified in the router telemetry control request), a request to update router telemetry control information 213 of the router 210 (e.g., based on router telemetry control information specified in the router telemetry control request), or a request to delete router telemetry control information 213 of the router 210 (e.g., based on identification, in the router telemetry control request, of the portion or portions of the router data 212 for which the associated router telemetry control information 213 is to be deleted). The router 210, based on the router telemetry control request, updates the router telemetry control information on the router 210. The router 210 may respond to the router telemetry control request by sending, to the customer application 225, a router telemetry control response indicative of a result of execution of the router telemetry control request at the router 210. The router 210 may then control exporting of router data 212 based on the router telemetry control information 213 of the router 210.

The customer application 225 and the router 210, as indicated above, may cooperate in a manner supporting customer router telemetry control based on use of a router telemetry control request directed from the customer application 225 to the router 210.

The router telemetry control request, as indicated above, may be in the form of a remote procedure call. In at least some embodiments, the set of telemetry control remote procedure calls that is supported by the customer application 225 and the router 210 for supporting customer router telemetry control may include UpdateTelemetry(key, data) and DeleteTelemetry(key). The UpdateTelemetry(key, data) call may be used to add new customer router telemetry control information to the router telemetry control information 213 of the router 210 or to update existing customer router telemetry control information in the router telemetry control information 213 of the router 210 (or, alternatively, separate AddTelemetry(key, data) and UpdateTelemetry (key, data) calls may be supported for adding and updating router telemetry control information 213 in the database of the router 210, respectively). The DeleteTelemetry(key) call may be used to remove existing customer router telemetry control information in the router telemetry control information 213 of the router 210 (or, alternatively, separate AddTelemetry(key, data) and UpdateTelemetry(key, data) calls may. In these telemetry control remote procedure calls, "key" identifies the customer data 212 for which the customer is controlling router telemetry (e.g., a link, uniform resource locator (URL), path (e.g., JavaScript Path (JSPath) or the like), or other key suitable for use in identifying within the database 210 the specific customer data 212 for which the customer is controlling router telemetry) and "data" is the router telemetry control information to be added to the database 210 for the "key" (e.g., specific in XML, JSON, or any other suitable format).

The router telemetry control request in the form of a remote procedure call, as indicated above, is executed by the router 210 to modify the router telemetry control information 213 maintained by the router 210 for controlling exporting of the router data 212 from the router 210. The use of UpdateTelemetry(key, data) and DeleteTelemetry(key) calls to control the router telemetry control information 213 may be further understood with respect to the following examples. For example, a particular example of the UpdateTelemetry(key, data) remote procedure call is UpdateTelemtry("/agent{name="xyz"}/tunnels/tunnel{name="SFO-to-JFK"}", "{Uptime: 10min, State: Up}"), which would add or update the router telemetry control information 213 for the "key" (namely, for the "SFO-to-JFK" tunnel) based on the "data" portion. Similarly, for example, a particular example of the DeleteTelemetry(key) remote procedure call is UpdateTelemtry("/agent{name="xyz"}/tunnels/tunnel{name="SFO-to-JFK"}"), which would delete the router telemetry control information 213 for the "key" (namely, for the "SFO-to-JFK" tunnel).

It will be appreciated that router 210 and customer device 220 may be configured to support various other functions for supporting customer router telemetry control.

It will be appreciated that, although primarily presented herein within the context of embodiments for supporting telemetry control for a particular type of device (namely, a router), various example embodiments for supporting telemetry control for a router that are presented herein may be used or adapted for use in supporting telemetry control for other types of devices (e.g., switches, servers, or any other devices which may utilize telemetry for exposing device data of the devices). As such, as discussed further below, various more general embodiments are further presented with respect to FIGS. 3-4.

Figure 3:
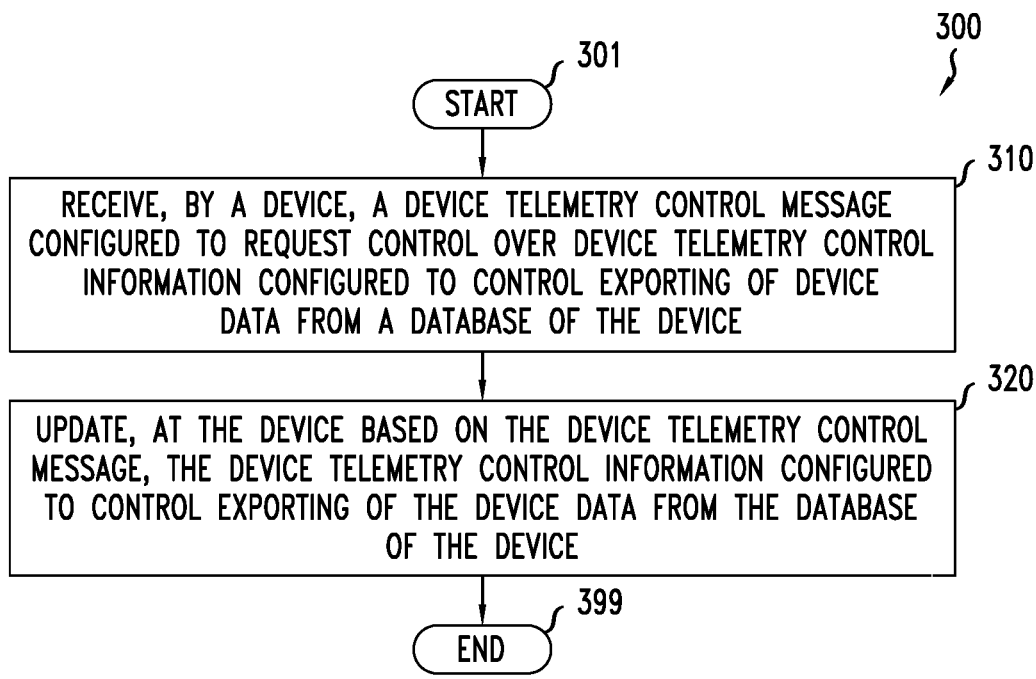
FIG. 3 depicts an example embodiment of a method for use by a device to support device telemetry control.

FIG. 3 depicts an example embodiment of a method for use by a device to support device telemetry control. It will be appreciated that, although primarily presented as being performed serially, at least a portion of the functions of method 300 may be performed contemporaneously or in a different order than as presented with respect to FIG. 3. At block 301, method 300 begins. At block 310, receive, by a device, a device telemetry control message configured to request control over device telemetry control information configured to control exporting of device data from a database of the device. At block 320, update, at the device based on the device telemetry control message, the device telemetry control information configured to control exporting of device data from the database of the device. At block 399, the method 300 ends. It will be appreciated that various functions presented with respect to FIG. 2 may be provided within the context of method 300 of FIG. 3.

Figure 4:
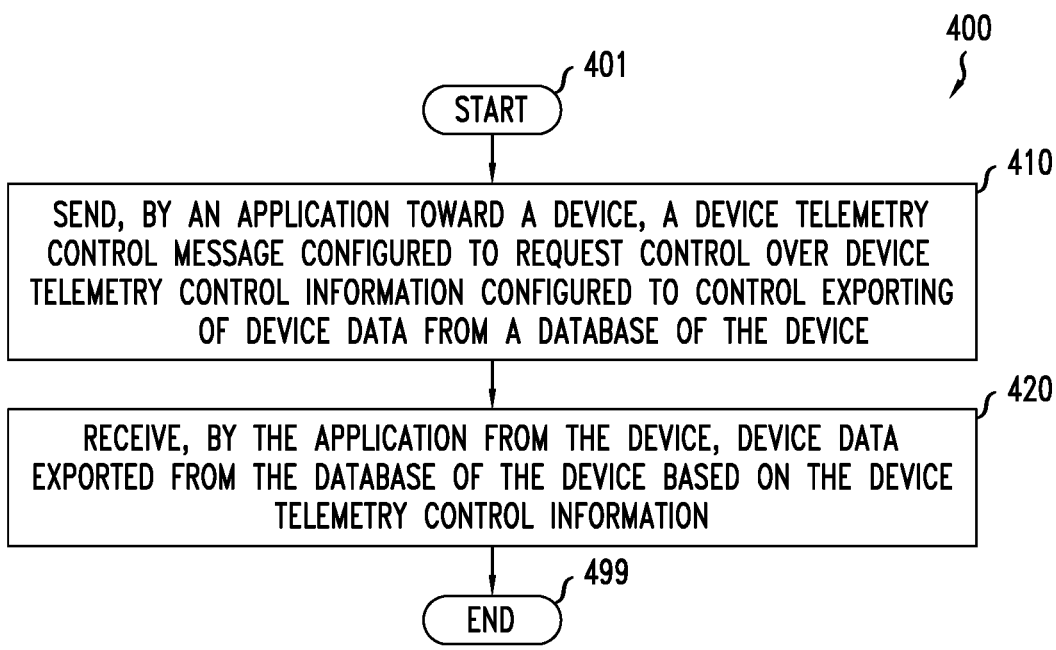
FIG. 4 depicts an example embodiment of a method for use by an application to support device telemetry control.

FIG. 4 depicts an example embodiment of a method for use by an application to support device telemetry control. It will be appreciated that, although primarily presented as being performed serially, at least a portion of the functions of method 400 may be performed contemporaneously or in a different order than as presented with respect to FIG. 4. At block 401, method 400 begins. At block 410, send, by an application toward a device, a device telemetry control message configured to request control over device telemetry control information configured to control exporting of device data from a database of the device. At block 420, receive, by the application from the device, device data exported from the database of the device based on the device telemetry control information. At block 499, the method 400 ends. It will be appreciated that various functions presented with respect to FIG. 2 may be provided within the context of method 400 of FIG. 4.

Various example embodiments for device telemetry control may provide various advantages or potential advantages. For example, various example embodiments for device telemetry control may provide a customer with additional control over access to device data of a device via device telemetry by providing the customer with additional control over the device telemetry (e.g., by enabling the customer to insert their own customer device telemetry control information into the device telemetry control information of the device that controls device telemetry on the device). Various example embodiments for device telemetry control may provide various other advantages or potential advantages.

Figure 5:
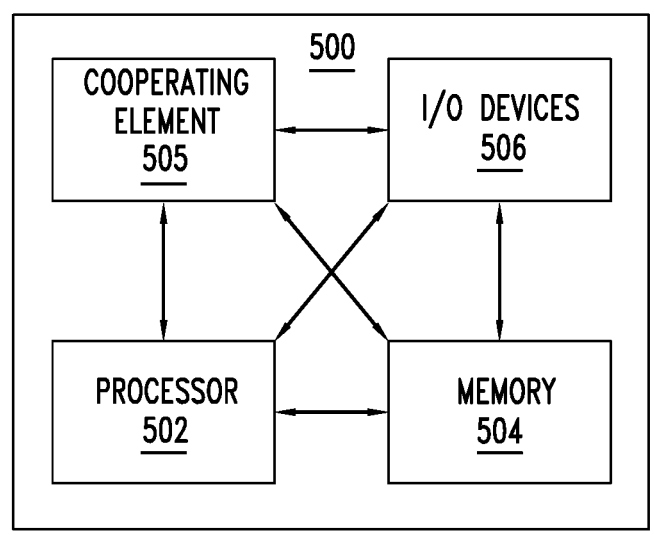
FIG. 5 depicts an example embodiment of a computer suitable for use in performing various functions presented herein.

FIG. 5 depicts an example embodiment of a computer suitable for use in performing various functions presented herein.

The computer 500 includes a processor 502 (e.g., a central processing unit, a processor having a set of processor cores, a processor core of a processor, or the like) and a memory 504 (e.g., a random access memory, a read only memory, or the like). The processor 502 and the memory 504 may be communicatively connected. In at least some embodiments, the computer 500 may include at least one processor and at least one memory including program code, wherein the at least one memory and the program code are configured to, with the at least one processor, cause the computer to perform various functions presented herein.

The computer 500 also may include a cooperating element 505. The cooperating element 505 may be a hardware device. The cooperating element 505 may be a process that can be loaded into the memory 504 and executed by the processor 502 to implement functions as discussed herein (in which case, for example, the cooperating element 505 (including associated data structures) can be stored on a non-transitory computer-readable storage medium, such as a storage device or other storage element (e.g., a magnetic drive, an optical drive, or the like)).

The computer 500 also may include one or more input/output devices 506. The input/output devices 506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 500 may represent a general architecture and functionality suitable for implementing functional elements described herein, portions of functional elements described herein, or the like, as well as various combinations thereof. For example, computer 500 may provide a general architecture and functionality that is suitable for implementing one or more elements presented herein, such as a router 112 or a portion thereof, a management element 113 or a portion thereof, a management device 120 or a portion thereof, a management element 121 or a portion thereof, a router 210 or a portion thereof, a customer device 220 or a portion thereof, a device or a portion thereof configured to execute method 300, a device or a portion thereof configured to execute method 400, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
    at least one processor; and
    at least one memory storing instructions that, when executed by the at least one processor, cause the apparatus to at least:
        maintain, by a router in a database of the router, a data record including router data associated with operation of the router and router telemetry control information configured to control exporting of the router data from the database of the router, wherein the router telemetry control information includes provider router telemetry control information and customer router telemetry control information;
        receive, by the router, a telemetry control message including new customer router telemetry control information and configured to request control over the router telemetry control information of the data record, wherein the telemetry control message is configured to identify the data record and to specify an action for the customer router telemetry control information for the data record, wherein the telemetry control message includes a request for updating the customer router telemetry control information based on the new customer router telemetry control information;
        update, at the router based on the telemetry control message, the customer router telemetry control information of the data record to include the new customer router telemetry control information; and
        export, by the router from the database based on at least one of the provider router telemetry control information or the new customer router telemetry control information of the data record, at least a portion of the router data of the data record.

2. The apparatus of claim 1, wherein a key identifying the data record for which the device telemetry control message is intended is represented using a JavaScript Object Notation (JSON) Javascript Path (JSPath).

3. The apparatus of claim 1, wherein the router telemetry control information is formatted based on JavaScript Object Notation (JSON).

4. The apparatus of claim 1, wherein the router telemetry control information includes at least one of:
    a data identifier configured to identify the router data with which the router telemetry control information is associated;
    a timing parameter configured to control timing of exporting of the router data from the database of the router;
    a location parameter configured to identify an export location for the router data being exported from the database of the router; or a data control parameter configured to control a manner in which the router data is exported from the database of the router.

5. The apparatus of claim 1, wherein the telemetry control message is received from an application.

6. The apparatus of claim 5, wherein the application is running on the router.

7. The apparatus of claim 6, wherein the application is running on a remote device that is remote from the router.

8. The apparatus of claim 1, wherein the telemetry control message is received in a remote procedure call.

9. The apparatus of claim 8, wherein the remote procedure call is based on gRPC.

10. The apparatus of claim 1, wherein the instructions, when executed by the at least one processor, cause the apparatus to at least:
send, by the router toward a source of the telemetry control message, an indication that the customer router telemetry control information has been updated.

11. A non-transitory computer-readable medium comprising program instructions that, when executed by an apparatus, cause the apparatus to at least:
maintain, by a router in a database of the router, a data record including router data associated with a operation of the router and router telemetry control information configured to control exporting of the router data from the database of the router, wherein the router telemetry control information includes provider router telemetry control information and customer router telemetry control information;
receive, by the router, a telemetry control message including new customer router telemetry control information and configured to request control over the router telemetry control information of the data record, wherein the telemetry control message is configured to identify the data record and to specify an action for the customer router telemetry control information for the data record, wherein the telemetry control message includes a request for updating the customer router telemetry control information based on the new customer router telemetry control information;
update, at the router based on the telemetry control message, the customer router telemetry control information of the data record to include the new customer router telemetry control information; and
export, by the router from the database based on at least one of the provider router telemetry control information or the new customer router telemetry control information of the data record, at least a portion of the router data of the data record.

12. A method, comprising:
maintaining, by a router in a database of the router, a data record including router data associated with operation of the router and router telemetry control information configured to control exporting of the router data from the database of the router, wherein the router telemetry control information includes provider router telemetry control information and customer router telemetry control information;
receiving, by the router, a telemetry control message including new customer router telemetry control information and configured to request control over the router telemetry control information of the data record, wherein the telemetry control message is configured to identify the data record and to specify an action for the customer router telemetry control information for the data record, wherein the telemetry control message includes a request for updating the customer router telemetry control information based on the new customer router telemetry control information;
updating, at the router based on the telemetry control message, the customer router telemetry control information of the data record to include the new customer router telemetry control information; and
exporting, by the router from the database based on at least one of the provider router telemetry control information or the new customer router telemetry control information of the data record, at least a portion of the router data of the data record.

* * * * *